April 12, 1955  R. WARD  2,706,068
APPARATUS FOR DISCHARGING FERTILIZER
Filed April 3, 1950  3 Sheets-Sheet 1

INVENTOR.
Reid Ward
BY
ATTORNEY.

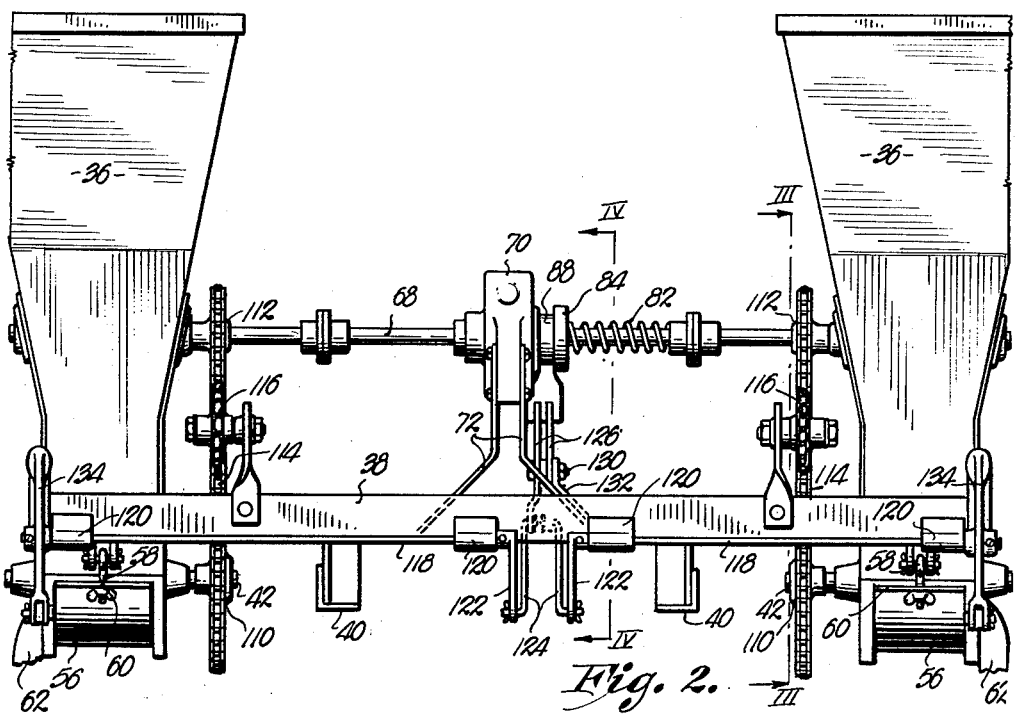
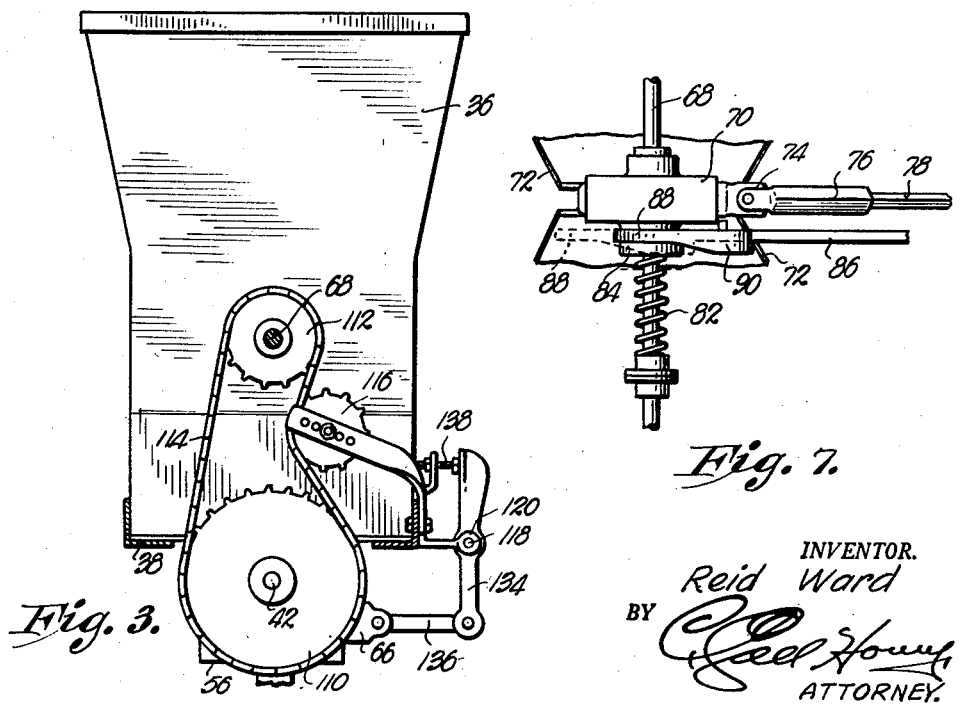

April 12, 1955
R. WARD
2,706,068
APPARATUS FOR DISCHARGING FERTILIZER
Filed April 3, 1950
3 Sheets-Sheet 3
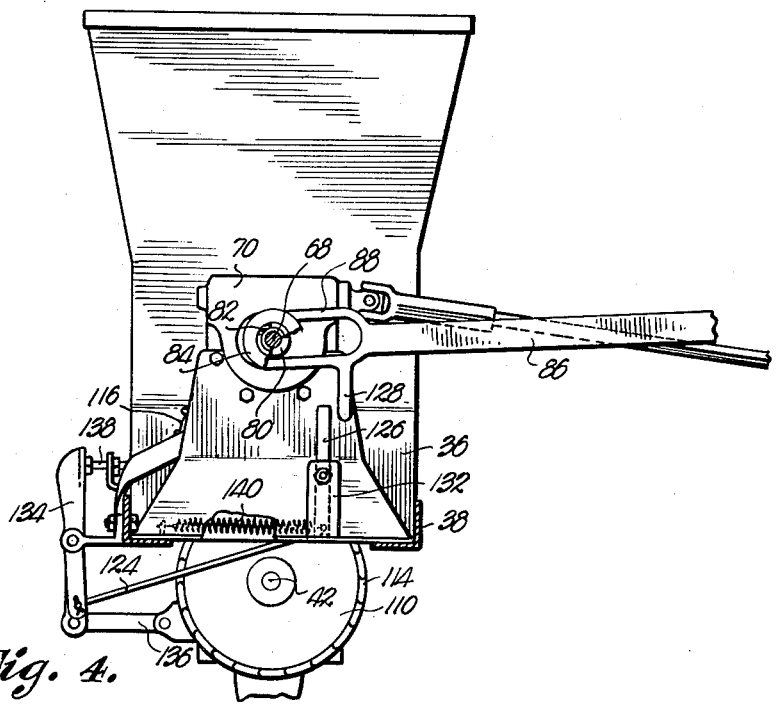
Fig. 4.
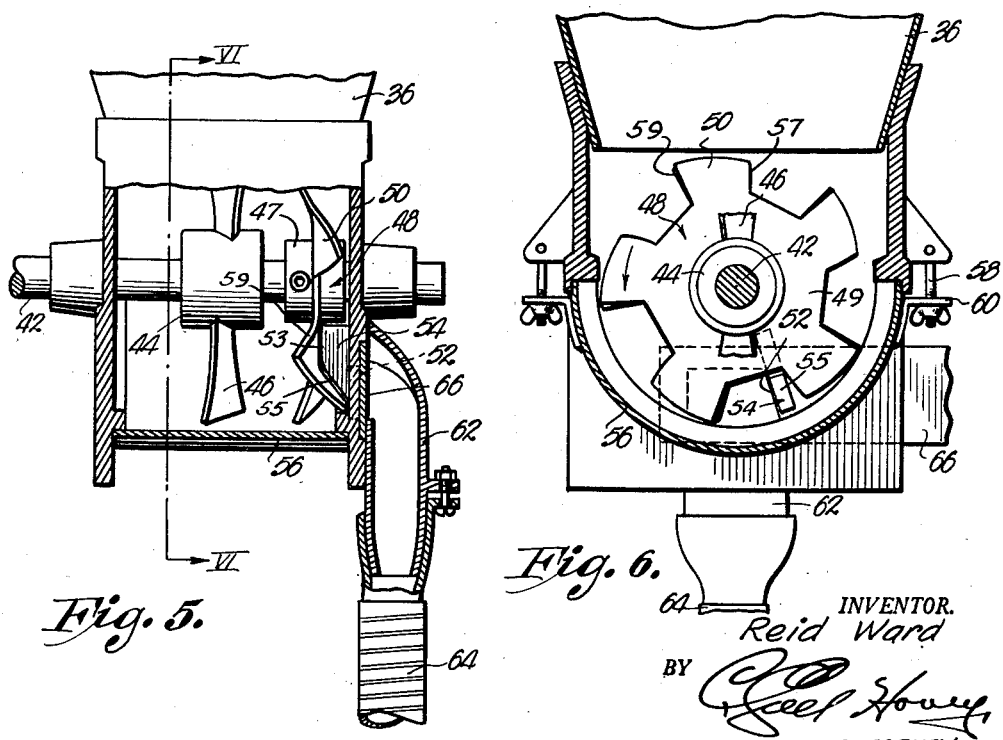
Fig. 5.
Fig. 6.
INVENTOR.
Reid Ward
BY
ATTORNEY.

United States Patent Office 2,706,068
Patented Apr. 12, 1955

2,706,068

APPARATUS FOR DISCHARGING FERTILIZER

Reid Ward, Ottawa, Kans., assignor to Baldwin-Ward Mfg. Co., Inc., Ottawa, Kans., a corporation of Kansas Application April 3, 1950, Serial No. 153,698

6 Claims. (Cl. 222—342)

This invention relates generally to farm implements and has to do with structure adapted to dispense fertilizer, one of the objects being to provide a fertilizer dispenser that is adapted for mounting upon another primary implement for movement therewith and for fully automatic operation by a tractor upon which the primary implement and the attachment are mounted.

It is the primary object of this invention to provide structure for dispensing fertilizer evenly and continuously over a long period of time without the usual difficulties relating to clogging and jamming resulting from formation of lumps due to dampness, packing, settling and other factors, all of which tend to prevent free flow of the material even though the actual dispensing mechanism continues to operate.

Means for fertilizing open fields may, obviously, be made in the form of a unitary implement that is either towed or carried by a tractor, but it is common practice to mount a fertilizer dispenser upon another implement to simultaneously distribute fertilizer while plowing, discing, listing or otherwise carrying on the usual farm operations. This eliminates double traversing of the ground to be fertilized and makes it possible to properly feed the fertilizer into the soil for intimate admixing therewith.

It is an important object of the present invention therefore, to provide a tractor-operated fertilizer attachment that is adapted for mounting directly upon a lister or like implement that is in turn carried by the tractor and to additionally provide means for automatically rendering the fertilizer attachment inoperable as the lister is raised by the tractor to an inoperative condition.

Another important object of the present invention is to provide a fertilizer attachment having means for dispensing the fertilizer through direct connection with the power take-off of the tractor, there being structure for disconnecting the tractor and the dispensing mechanism as the implement and the attachment are raised to an inoperable condition by the tractor.

A further object of this invention is to provide a fertilizer assembly having a hopper for the fertilizer to be dispensed that is, in turn, provided with a valved outlet opening also interconnected with the tractor for movement to a closed condition as the primary implement and the attachment thereon are raised by the tractor.

An additional object includes the way in which an agitator assembly is provided in the fertilizer hopper and including shearing structure adjacent the outlet opening for preventing clogging.

Many more minor objects will be made clear or become apparent as the following specification progresses, reference being had to the accompanying drawings, wherein:

Fig. 2 is a rear elevational view showing the fertilizer attachment per se.

Fig. 3 is a cross-sectional view taken on line III—III of Fig. 2.

Fig. 4 is a cross-sectional view taken on line IV—IV of Fig. 2.

Fig. 5 is an elevational view of one of the hoppers of the dispenser, parts being broken away and in section to reveal details of construction.

Fig. 6 is a cross-sectional view taken on line VI—VI of Fig. 5; and

Fig. 7 is a fragmentary, top plan view of the clutch release assembly shown in Figs. 2 and 4.

Figure 1:
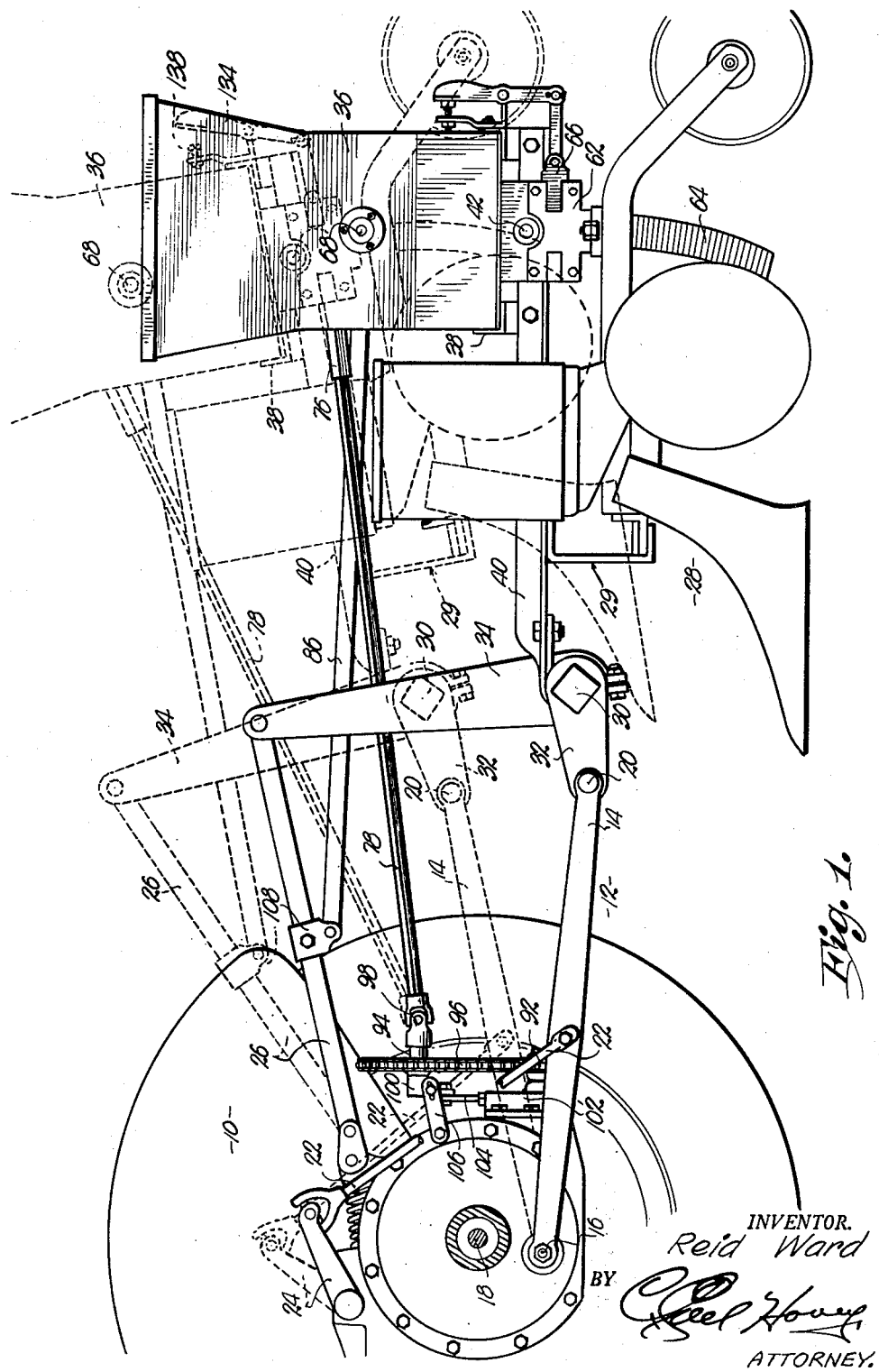
Figure 1 is a side elevational view of apparatus for discharging fertilizer made in accordance with the present invention, illustrating the same operably mounted upon a lister and connected with the lister to a tractor.

There is shown fragmentarily in Fig. 1 of the drawings, a tractor 10 of conventional character and with which the fertilizer dispenser hereof is particularly adapted to be used. It is understood however, that with slight modifications, other types of tractors may be used and that, therefore, tractor 10 is for illustrative purposes only. Tractor 10 is provided with a tow bar assembly broadly designated by the numeral 12 and including a pair of spaced-apart, rearwardly extending arms, one only of which is illustrated and designated by the numeral 14.

The two arms 14 are pivoted to the tractor 10 at the rearmost ends thereof for swinging movement on a substantially horizontal axis 16 immediately below the rear axle 18 of tractor 10. Arms 14 are caused to swing on axis 16 through the medium of a link 22 for each arm 14 respectively. A power-driven, swingable bar 24 for each arm respectively imparts movement to the latter through links 22. An elongated stabilizer bar 26 also forms a part of the assembly 12 and is pivoted at one end thereof to the tractor 10.

There is shown in Fig. 1 of the drawings, a lister broadly designated by the numeral 28 and chosen for illustration as representing one type of implement upon which the fertilizer attachment hereof is adapted to be mounted. Lister 28 has a frame 29 that includes a beam 30 extending along the forwardmost end thereof and having a link 32 pivotally receiving each arm 14 respectively as at 20. Beam 30 is also provided with a pair of centrally disposed, upstanding members 34 (one only being shown in Fig. 1) that pivotally receive the outermost free end of the stabilizer bar 26. It is through tow bar assembly 12 and its interconnection with lister 28 that the latter is caused to be raised from the operable position shown in full lines in Fig. 1 to the dotted line position thereof.

The fertilizer attachment hereof includes a pair of substantially identical hoppers 36 that are mounted in spaced-apart relationship upon a frame 38 that is, in turn, secured to framework 40. Framework 40 is secured to framework 29 in any suitable manner not here shown.

An agitator 44 having a plurality of radial vanes 46 that are twisted as illustrated in Fig. 5, is mounted upon a shaft 42 within each hopper 36 respectively and adjacent the lowermost end of the latter. A combination agitating and feeding wheel 48 is also mounted on shaft 42 in each hopper 36 respectively and adjacent an outlet opening 52 formed in one side wall of the latter. Each wheel 48 includes a hub 47 mounted on shaft 42 and a flat disc 49 having a plurality of relatively short, twisted blades 50. Each blade 50 has a trailing edge 57 and a leading edge 59, clearly shown in Fig. 6 of the drawing. An inwardly-extending scraper blade 54, contoured complementarily with the shape of wheel 48, in that the inner edge thereof has a vertical length 53 facing flat disc 49 and an inclined length 55 opposed to the trailing edges 57 of blades 50, is rigidly secured within each hopper 36 respectively and adjacent the outlet opening 52 thereof.

A bottom wall 56 for each hopper 36 respectively defines a semi-circle, as shown in Fig. 6, and is attached to the corresponding hopper 36 by means of a number of bolts 58 having wing nuts thereon and passing through slots within out-turned flanges 60 on bottom 56. Each outlet opening 52 has a down-turned spout 62 registering therewith and terminating in an elongated, flexible conduit 64. A horizontally slidable gate 66 is provided for each outlet opening 52 respectively.

An elongated, horizontal shaft 68 disposed in transverse relationship to the path of travel of the tractor 10 and the lister 28 passes through the hoppers 36 and is journalled for rotation therein. A plurality of radially extending agitator arms are mounted on the shaft 68 within each hopper 36 respectively. Shaft 68 passes through a housing 70 disposed between hoppers 36 and supported by a pair of downwardly diverging plates 72 that are mounted upon the framework 38. Mounted within housing 70 is a gear loosely circumscribing the shaft 68 and a worm in mesh with such gear (all not shown), said worm being connected with a universal joint 74 that is in turn connected with a short tube 76.

Tube 76 is polygonal in cross-section to conform with the cross-sectional contour of an elongated shaft 78 that is telescoped within tube 76 and slidable longitudinally therein.

A collar 80 mounted for sliding movement on shaft 68 longitudinally thereof, is also keyed to shaft 68 for rotation therewith and extends into the housing 70. The aforesaid gear within housing 70 that is loosely mounted on shaft 68 and the innermost end of collar 80, are provided conventionally with interlocking clutch means to the end that when collar 80 is at the innermost end of its path of travel with respect to housing 70, shafts 68 and 78 are interlocked for simultaneous rotation.

A spring 82 coiled about shaft 68 bears against collar 80 and yieldably holds the latter at the innermost end of its path of travel. Collar 80 is provided with an annular out-turned flange 84 spaced from housing 70 and an elongated link 86 has an elliptical loop 88 on one end thereof that circumscribes the collar 80 between housing 70 and flange 84. The width of the loop 88 adjacent the link 86 is greater as at 90 than the distance between shoulder 84 and housing 70 when the collar 80 is at its innermost end of its path of travel as indicated in Fig. 7. Consequently, when link 86 moves toward the collar 80, enlarged portion 90 of loop 88 will be disposed between housing 70 and shoulder 84, thus retracting collar 80 against the action of spring 82, and disengaging the clutch assembly.

A sprocket wheel 92 on the power take-off of tractor 10 is connected with a second sprocket wheel 94 through the medium of a chain 96, and sprocket wheel 94 is coupled with shaft 78 by means of a universal joint 98. Sprocket wheel 94 is rotatably mounted in a bearing 100 secured to tractor 10 by means of a bracket 102. Adjustable links 104 and 106 join bearing 100 with bracket 102 and with tractor 10 respectively. Link 86 is pivotally connected with a clamp 108 that is in turn rigid to stabilizer bar 26 intermediate the ends of the latter.

Shafts 42 of hoppers 36 are operably connected with shaft 68 through the medium of a sprocket wheel 110 on each shaft 42 respectively, a sprocket wheel 112 on shaft 68 adjacent each hopper 36 respectively and an endless chain 114 interconnecting sprocket wheels 110 and 112. An idler sprocket 116 rotatably fastened to frame 38, maintains chain 114 in a taut condition.

Reciprocation of the gates 66 to and from a position closing the respective openings 52, is accomplished through operation of similar mechanism and including an elongated shaft 118 rotatably mounted in bearings 120 on frame 38. A crank 122 extends radially from shaft 118 at one end thereof and a link 124 pivotally interconnects cranks 122 and an arm 126. Arms 126 extend upwardly through a slot that is formed in one of the plates 72 and are pivotally mounted on a common shaft 130 secured to a bracket 132 on frame 38.

A trigger 134 is rigidly secured to shaft 118 at its outermost end opposite from crank 122. A link 136 pivotally interconnects gate 66 with the lowermost end of trigger 134 and swinging movement of trigger 134 in one direction is limited by an adjustable bolt 138 on frame 38 within the path of travel of the uppermost end of trigger 134. Arms 126 have their uppermost ends disposed within the path of travel of a depending flap 128 on the loop 88 adjacent link 86, and arms 126 are held biased toward the flap 128 by spring 140.

When the lister 28 is in the full-line position illustrated in Fig. 1 of the drawing, the entire fertilizer assembly above described is in condition for operation. As tractor 10 moves forwardly towing lister 28 therebehind and with the fertilizer attachment mounted upon lister 28, fertilizer is dispensed from both hoppers 36 through their respective tubes 64.

Both gates 66 are in the open condition with respect to their outlet openings 52 and rotation of agitators 44 and 48, as well as the agitators upon shaft 68 within hoppers 36, takes place through rotation of shaft 78 from the power take-off of tractor 10 having sprocket wheel 92 thereon. Agitators 44 and those upon shaft 68 cooperate with agitator 48 in preventing clogging of the fertilizer to be dispensed and directing the same to outlet openings 52 in such condition as to assure free flow thereof into tubes 64 without jamming. By provision of the blades 54 that are disposed relatively close to the trailing edges 57 of blades 50, a scraping action is presented adjacent the openings 52 that also positively prevents a clogging of openings 52. During turning operations and at other times when lister 28 is raised to the inoperative position as shown by dotted lines in Fig. 1, the fertilizer attachment hereof is also rendered fully inoperable. As the tow-bar assembly 12 raises lister 28 through beam 30, shaft 68 moves toward clamp 108 irrespective of the fact that the latter also swings upwardly a slight distance as shown in Fig. 1. Such movement of shaft 68, and of course, of collar 80, shifts the latter within loop 88 toward link 86 and disengages the clutch assembly within housing 70 as above described. It is noted that as lister 28 swings upwardly, tube 76 is free to slide on shaft 78 toward joint 98. Thus, while shaft 78 continues to rotate, such rotative movement is not imparted to the shafts 68 and 42 since the gear and worm in housing 70 are free to turn, while collar 80 is retracted against the action of spring 82. Upward swinging movement of frame 38 also shifts the arms 126 toward and against the depending flap 128 on loop 88, swinging arms 126 on pivot 130 against the action of springs 140. Shafts 118 are rotated through links 124 and cranks 122 to swing the triggers 134 away from adjustable stops 138. The lowermost ends of the triggers 134 move toward the bottom walls 56 of hoppers 36 and thereby shift the gates 66 toward the tractor 10 and to a closed position through links 136. Manifestly, as the towing assembly 12 of tractor 10 is lowered, gates 66 are again opened and shafts 68 and 42 are caused to rotate and dispense fertilizer.

It is seen from the foregoing that a dispenser has been provided that is capable of discharging material that tends to clog and jam within restricted openings and that is also capable of being automatically and quickly rendered inoperable whenever the implement upon which it is mounted, is shifted by a tractor or other means to the inoperable condition. The attachment has no effect upon the lister 28 or other implement upon which it is to be mounted and can be easily detached while leaving the implement 28 mounted on the tractor 10 and ready for use as desired.

The mechanism shown in Figs. 5 and 6 of the drawings is clearly operable irrespective of how shaft 42 is driven, whether or not gate 66 is used, whether the hopper 36 is carried by another implement or is provided with its own mobile support, whether or not the hopper 36 is supported by a tractor or is otherwise motivated, and irrespective of whether or not separate land wheels are used to provide a prime mover for the agitator structure.

The utilization of feeding means 48 together with scraper 54 is of prime importance. Fertilizer dispensers heretofore developed and placed in use have, so far as I am aware, all been highly unsatisfactory because of the fact that an even, continuous flow is not possible.

Fertilizing materials for the most part are all difficult to handle because of hardening and forming of lumps when subjected to dampness. Unless the relative humidity is low, such tendency to harden will cause clogging even after the hopper has been filled with apparently dry material. While agitators tend to prevent packing and forming of a cavity near the outlet opening, flow is still retarded by formation of the material on the blades of the agitators themselves.

Attention is therefore, specifically called to the way in which the disc 49 and the blades 50 are continuously cleaned by scraper 54 as agitator 48 rotates. The trailing edge 57 of each blade 50 is scraped by edge length 55 of scraper 54 and the disc 49 is scraped by edge length 53 of scraper 54 so that the material removed drops downwardly into outlet 52. Fig. 5 clearly shows the way in which blades 50 are twisted to feed the material scraped therefrom directly into opening 52. Thus, the precise disposition and form of scraper blade 54, complemental with blades 50 and adjacent to outlet 52 to form a guide trough for the fertilizer, meets the aforesaid difficulties in an efficient, inexpensive and simple manner.

Manifestly, with slight changes and modifications, the attachment can be rendered universally adaptable for virtually any type of implement and can also be rendered adaptable for connection with and operation by tractors differing from that herein specifically illustrated. Accordingly, it is desired to be limited only by the spirit of the invention as defined by the scope of the appended claims.

Having thus described the invention, what is claimed as new and desired to be secured by Letters Patent is:

1. In a fertilizer dispenser, a container for a fertilizer to be dispensed having a bottom wall and a pair of opposed side walls, one of the side walls having an outlet opening adjacent said bottom wall; a horizontal shaft rotatably carried by said side walls above said opening; a combination agitating and feeding wheel mounted on the shaft between the side walls for rotation with the shaft adjacent said one side wall, said wheel including a disc having a plurality of blades extending outwardly therefrom, each blade having an axis radial to the shaft and a leading edge and a trailing edge when the shaft is rotated in one direction, the blades each being twisted on said axis thereof with the trailing edges closer to the one side wall than the leading edges, the disc and its blades having surfaces facing the said one side wall; and a single plate-like scraper on said one side wall within the container and disposed between the one side wall and the wheel adjacent said opening for scraping fertilizer entirely from said surfaces and forcing said fertilizer into the outlet opening as the shaft rotates in said one direction.

2. In a fertilizer dispenser as provided in claim 1 wherein said scraper is below the shaft and provided with an edge facing said wheel, said edge having a length inclined downwardly and outwardly toward said one side wall as the lowermost end of the scraper is approached.

3. In a fertilizer dispenser as provided in claim 1 wherein said scraper is below the shaft and provided with a face perpendicular to said one side wall.

4. In a fertilizer dispenser as provided in claim 3 wherein the uppermost end of the scraper is in a vertical plane through the shaft and parallel to said axis of rotation of the shaft and wherein said face is inclined away from said plane in said direction of rotation of the shaft as the lowermost end of the scraper is approached.

5. In a fertilizer dispenser as provided in claim 4 wherein said outlet opening extends from the scraper in a direction opposite to said direction of rotation of the shaft.

6. In a fertilizer dispenser as set forth in claim 5 wherein said scraper is provided with an edge facing said surfaces, a portion of said edge being inclined downwardly and outwardly toward said one side wall as the lowermost end of the scraper is approached.

References Cited in the file of this patent

UNITED STATES PATENTS

| | | |
|---|---|---|
| 23,164 | Garrett | Mar. 8, 1859 |
| 115,750 | Machen | June 6, 1871 |
| 121,815 | Ridley | Dec. 12, 1871 |
| 200,286 | Harbin | Feb. 12, 1878 |
| 237,843 | Everett | Feb. 15, 1881 |
| 294,313 | Evans | Feb. 26, 1884 |
| 662,532 | Ham | Nov. 22, 1900 |
| 692,715 | Sargeant | Feb. 4, 1902 |
| 1,090,120 | Scott | Mar. 10, 1914 |
| 2,302,651 | Holly | Nov. 17, 1942 |
| 2,332,713 | Hand | Oct. 26, 1943 |
| 2,363,961 | Hart | Nov. 28, 1944 |
| 2,396,980 | Blue | Mar. 19, 1946 |
| 2,408,285 | Ashbaugh | Sept. 24, 1946 |
| 2,547,868 | Judson | Apr. 3, 1951 |
| 2,583,365 | Eddy | Jan. 22, 1952 |

FOREIGN PATENTS

| | | |
|---|---|---|
| 4,797 | Great Britain | Apr. 6, 1886 |
| 439,363 | Germany | Jan. 10, 1927 |